United States Patent
Okamoto et al.

(10) Patent No.: US 11,959,932 B2
(45) Date of Patent: Apr. 16, 2024

(54) AUTOMATIC ANALYZING APPARATUS

(71) Applicant: Canon Medical Systems Corporation, Otawara (JP)

(72) Inventors: Mitsuo Okamoto, Nasushiobara (JP); Naoto Sato, Nasushiobara (JP); Reiko Maruyama, Nasushiobara (JP); Masaaki Saitou, Nasushiobara (JP); Atsushi Hosooka, Otawara (JP); Tamaki Honda, Nasushiobara (JP)

(73) Assignee: Canon Medical Systems Corporation, Otawara (JP)

( * ) Notice: Subject to any disclaimer, the term of this patent is extended or adjusted under 35 U.S.C. 154(b) by 49 days.

(21) Appl. No.: 17/654,662

(22) Filed: Mar. 14, 2022

(65) Prior Publication Data

US 2022/0299540 A1    Sep. 22, 2022

(30) Foreign Application Priority Data

Mar. 16, 2021   (JP) .................................. 2021-042301

(51) Int. Cl.
*G01N 35/10* (2006.01)
*G01F 23/263* (2022.01)
*G01N 1/44* (2006.01)

(52) U.S. Cl.
CPC ....... *G01N 35/1079* (2013.01); *G01F 23/266* (2013.01); *G01N 1/44* (2013.01); *G01N 35/1002* (2013.01)

(58) Field of Classification Search
CPC ................ G01N 35/1079; G01N 1/44; G01N 2035/1025; G01N 35/1011; G01N 35/1009; G01N 35/00; G01F 23/266; G01F 23/263
See application file for complete search history.

(56) References Cited

U.S. PATENT DOCUMENTS

| | | | | |
|---|---|---|---|---|
| 5,451,940 A | * | 9/1995 | Schneider | G01L 9/0072 340/870.37 |
| 5,463,377 A | * | 10/1995 | Kronberg | G08B 21/20 340/592 |
| 5,493,922 A | * | 2/1996 | Ramey | G01N 35/1009 73/304 C |
| 8,547,114 B2 | * | 10/2013 | Kremin | H03M 11/02 324/678 |
| 9,977,092 B2 | * | 5/2018 | Inoue | G01R 35/00 |
| 2010/0259397 A1 | * | 10/2010 | Du | G01F 23/265 340/618 |
| 2021/0015163 A1 | * | 1/2021 | Mizuguchi | H01M 10/0525 |

FOREIGN PATENT DOCUMENTS

JP     63-259420 A    10/1988

* cited by examiner

*Primary Examiner* — Francis C Gray

(74) *Attorney, Agent, or Firm* — Oblon, McClelland, Maier & Neustadt, L.L.P.

(57) ABSTRACT

According to one embodiment, an automatic analyzing apparatus includes a probe and a liquid level detector. The liquid level detector is electrically connected to the probe and detects contact between the probe and a liquid surface, wherein the liquid level detector comprises an adjuster configured to adjust electrostatic capacitance of one or more capacitors for circuitry for use in liquid level detection.

7 Claims, 12 Drawing Sheets

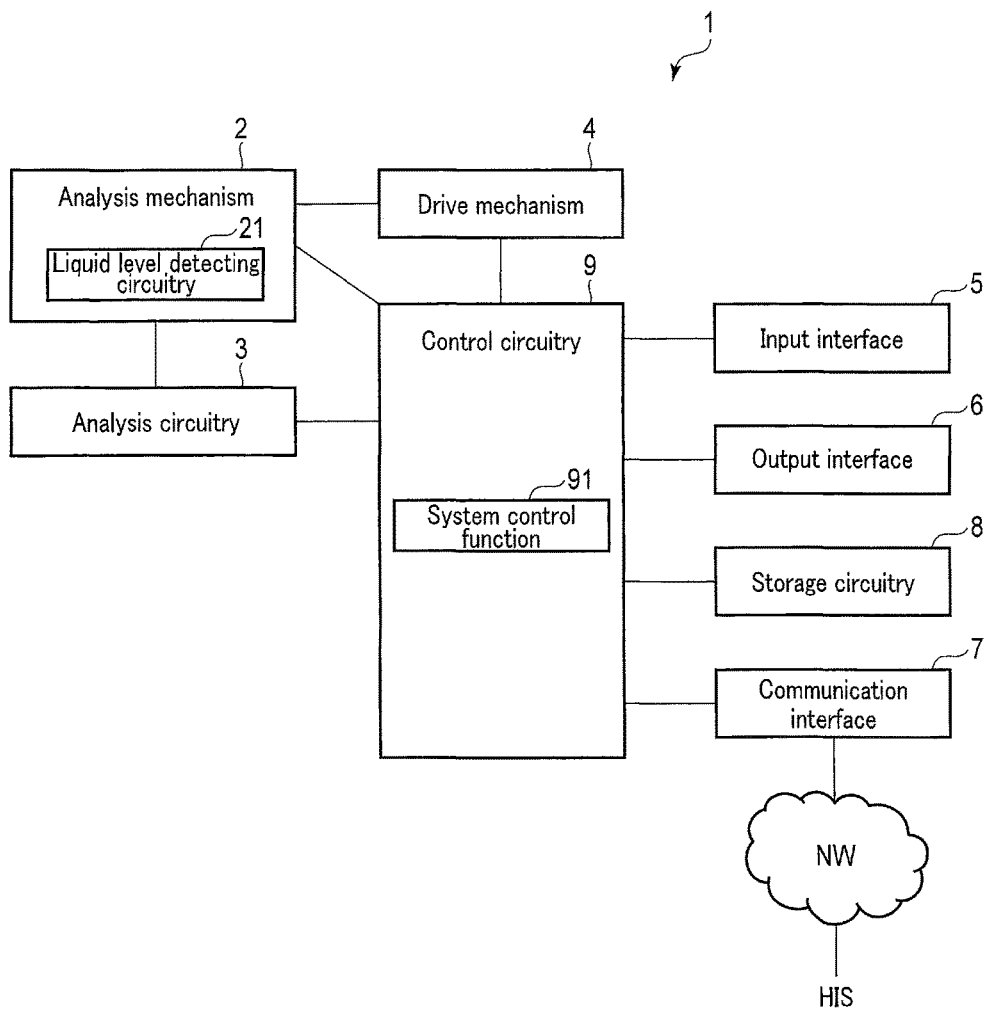
F I G. 1

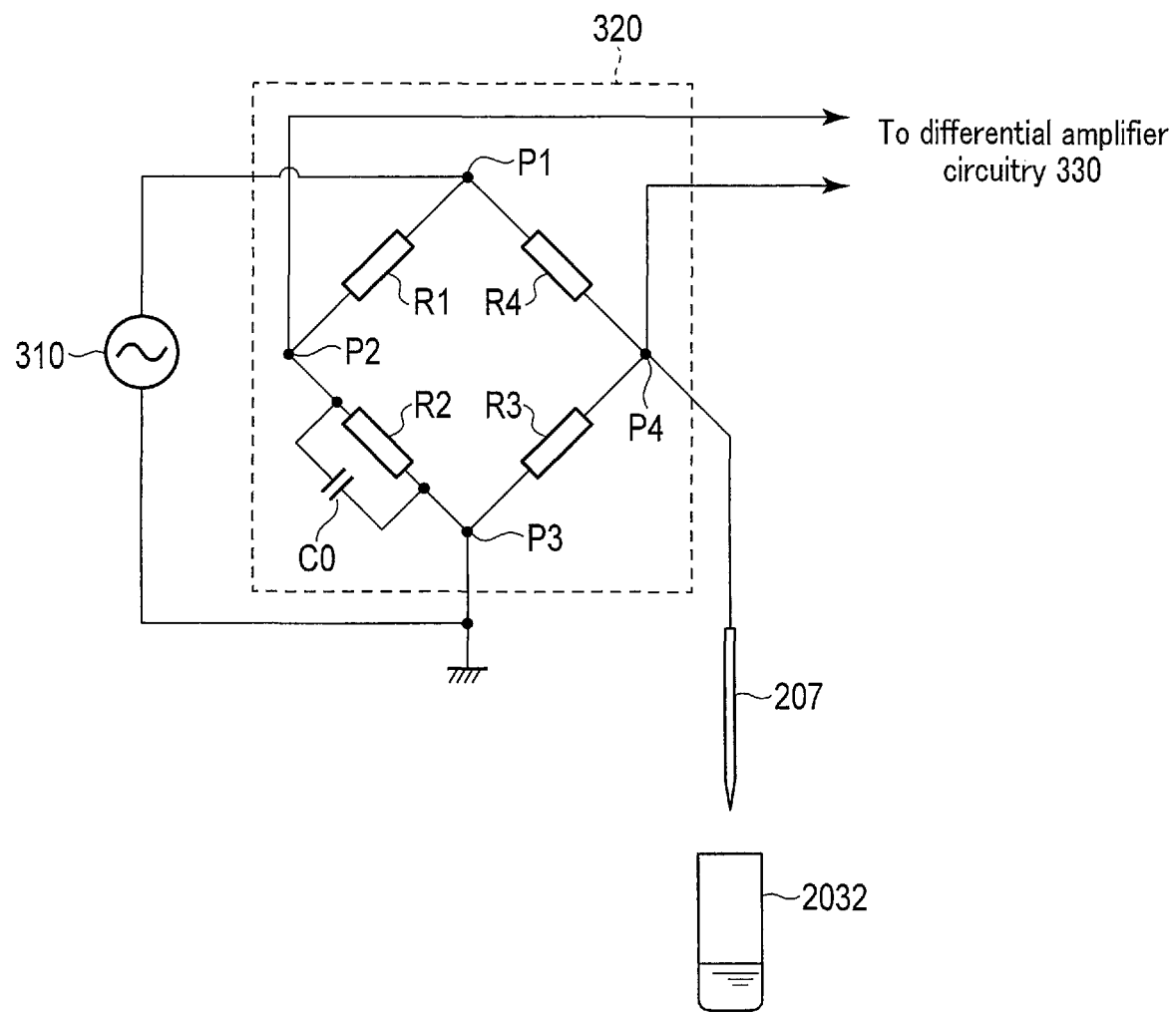
F I G. 12

AUTOMATIC ANALYZING APPARATUS

CROSS-REFERENCE TO RELATED APPLICATIONS

This application is based upon and claims the benefit of priority from prior Japanese Patent Application No. 2021-042301, filed Mar. 16, 2021, the entire contents of which are incorporated herein by reference.

FIELD

Embodiments described herein relate generally to an automatic analyzing apparatus.

BACKGROUND

An automatic analyzing apparatus makes use of liquid level detecting circuitry, a conventionally known component for detecting an event of a probe and a liquid surface coming into contact with each other. This liquid level detecting circuitry detects a liquid level using signals which have been input differentially. For example, the liquid level detecting circuitry connects one of the differential inputs to the probe and leaves the other open. The liquid level is detected based on changes in signal amplitude and signal phase which occur along with a change in impedance due to contact between the probe and the liquid surface. Such liquid level detecting circuitry includes, as appropriate, automatic phase shifting circuitry by which signals differentially input during the non-contacting state of the probe and the liquid surface are adjusted to zero. With the automatic phase shifting circuitry, output values when the probe and the liquid surface are not in contact with each other can be kept to zero.

However, while automatic phase shifting circuitry of this type is capable of canceling out output variations caused due to a probe itself, it does not consider a presence of instruments or the like used with the probe. Examples of such instruments include a piercer needle for making a hole in a lid of a container, a heater for heating a reagent in the probe, and so on. In the instances where these instruments have a connection to the liquid level detecting circuitry, the output variations cannot be absorbed by the automatic phase shifting circuitry alone, and the accuracy of the liquid level detection could be degraded.

BRIEF DESCRIPTION OF THE DRAWINGS

FIG. 1 is a diagram showing an exemplary functional configuration of an automatic analyzing apparatus according to a first embodiment.

FIG. 12 is a diagram showing one exemplary form of connections for bridge circuitry and a sample dispensing probe in the conventional art.

DETAILED DESCRIPTION

Figure 2:
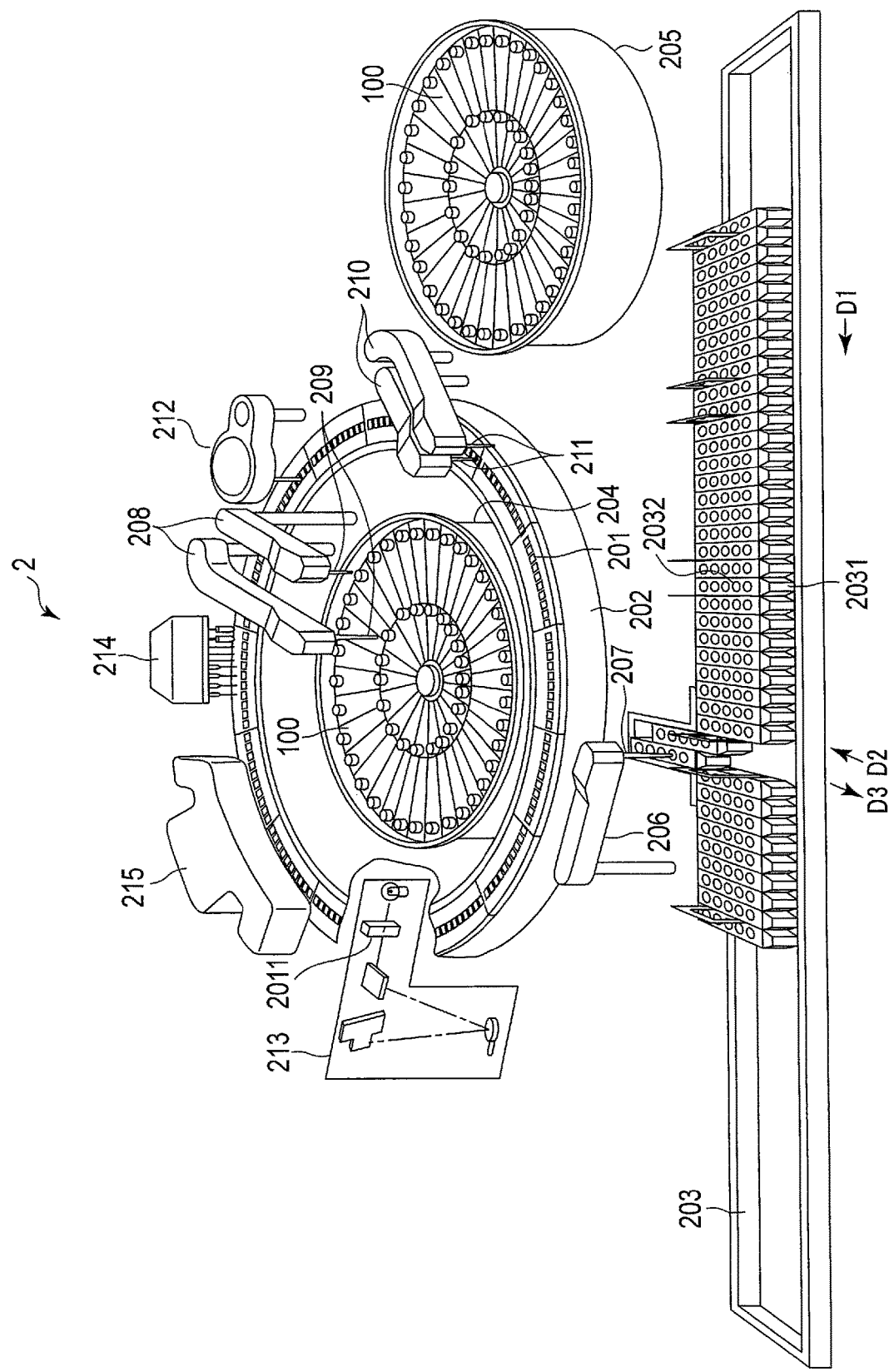
FIG. 2 is a diagram showing an exemplary design for the analysis mechanism given in FIG. 1.

In general, according to one embodiment, an automatic analyzing apparatus includes a probe and a liquid level detector. The liquid level detector is electrically connected to the probe and detects contact between the probe and a liquid surface, wherein the liquid level detector comprises an adjuster configured to adjust electrostatic capacitance of one or more capacitors for circuitry for use in liquid level detection.

The embodiments will be described in detail with reference to the drawings.

First Embodiment

FIG. 1 is a diagram showing an exemplary functional configuration of an automatic analyzing apparatus 1 according to the first embodiment. As shown in FIG. 1, the automatic analyzing apparatus 1 includes an analysis mechanism 2, analysis circuitry 3, a drive mechanism 4, an input interface 5, an output interface 6, a communication interface 7, storage circuitry 8, and control circuitry 9. The automatic analyzing apparatus 1 measures components in an analyte by subjecting a mixture liquid of the analyte and a reagent to a measurement process.

The analysis mechanism 2 mixes a sample, such as a standard sample or a subject sample (which may be called an "analyte"), with a reagent for the test item set for the sample. The analysis mechanism 2 measures the mixture liquid of the sample and the reagent to generate standard data and subject data which may be represented as, for example, an absorbency level. The analysis mechanism 2 includes liquid level detecting circuitry (liquid level detecting means) 21. A detailed description of this liquid level detecting circuitry 21 will be given later.

The analysis circuitry 3 is a processor to analyze the standard data and the subject data from the analysis mechanism 2 to generate data including calibration data and analysis data. The analysis circuitry 3 reads an analysis program from the storage circuitry 8 and generates the calibration data, the analysis data, etc., according to the read analysis program. Here, the calibration data is indicative of, for example, a relationship between the standard data and a standard value predetermined for the standard sample, and the analysis circuitry 3 generates this calibration data based on the standard data. Also, the analysis data may be represented as a concentration value and an enzyme activity value, and the analysis circuitry 3 generates this analysis data based on the subject data and the calibration data for the test item corresponding to the subject data. The analysis circuitry 3 outputs the generated data including the calibration data, the analysis data, etc. to the control circuitry 9.

The drive mechanism 4 drives the analysis mechanism 2 under the control of the control circuitry 9. The drive mechanism 4 is realized by, for example, a combination of a gear, a stepping motor, a belt conveyor, a lead screw, and so on.

The input interface 5 accepts, for example, settings of analysis parameters, etc., for each test item intended for a measurement-requested sample, from an operator or via an in-hospital network NW. The input interface 5 is realized by, for example, one or more of a mouse, a keyboard, a touch pad on which instructions are input by touching an operation screen, and the like. The input interface 5 is connected to the control circuitry 9 so that it converts operational commands input by an operator, etc. into electric signals and outputs them to the control circuitry 9.

In the disclosure herein, the input interface 5 is not limited to physical operating components such as a mouse, a keyboard, and a touch pad. Examples of the input interface 5 also include processing circuitry for electric signals which is adapted to receive an electric signal corresponding to an operational command input from an external input device separate from the automatic analyzing apparatus 1 and to output this electric signal to the control circuitry 9.

The output interface 6 is connected to the control circuitry 9 and outputs signals coming from the control circuitry 9. The output interface 6 is realized by, for example, one or more of display circuitry, print circuitry, an audio device, and the like. Such display circuitry may include a CRT display, a liquid crystal display, an organic EL display, an LED display, a plasma display, etc. Also, the display circuitry may include processing circuitry for converting data of a display subject into video signals and supplying the video signals to external entities. The print circuitry may include a printer, etc. The print circuitry may also include output circuitry for supplying data of a print subject to external entities. The audio device may include a speaker, etc. The audio device may also include output circuitry for supplying an audio signal to external entities.

The communication interface 7 is connected to, for example, the in-hospital network NW. The communication interface 7 performs data communication with a hospital information system (HIS) via the in-hospital network NW. It is also possible for the communication interface 7 to perform data communication with the HIS via a laboratory information system (LIS) connected to the in-hospital network NW.

The storage circuitry 8 may include a processor-readable storage medium such as a magnetic storage medium, an optical storage medium, or a semiconductor memory. Note that it is not required to realize the storage circuitry 8 by a single storage medium or device. For example, the storage circuitry 8 may be realized by multiple storage devices.

The storage circuitry 8 stores analysis programs for execution by the analysis circuitry 3 and control programs for realization of functions of the control circuitry 9. The storage circuitry 8 also stores, for each test item, the analysis data generated by the analysis circuitry 3. The storage circuitry 8 stores a test order input by an operator, etc., or a test order received by the communication interface 7 via the in-hospital network NW, etc.

The control circuitry 9 is, for example, a processor functioning as a center of the automatic analyzing apparatus 1. The control circuitry 9 executes the control programs stored in the storage circuitry 8 to realize functions corresponding to the executed programs. The control circuitry 9 may be provided with a storage area for storing at least a portion of the data stored in the storage circuitry 8.

FIG. 2 is a diagram showing an exemplary design for the analysis mechanism 2 shown in FIG. 1. As shown in FIG. 2, the analysis mechanism 2 includes a reaction disk 201, a constant temperature part 202, a rack sampler 203, a first reagent depository 204, and a second reagent depository 205. The analysis mechanism 2 also includes a sample dispensing arm 206, a sample dispensing probe 207, a first reagent dispensing arm 208, a first reagent dispensing probe 209, a second reagent dispensing arm 210, a second reagent dispensing probe 211, an electrode unit 212, a photometry unit 213, a washing unit 214, and a stirring unit 215.

First, a description will be given of the reaction disk 201, the constant temperature part 202, the rack sampler 203, the first reagent depository 204, and the second reagent depository 205.

The reaction disk 201 holds multiple reaction containers 2011 in an annular arrangement. The reaction disk 201 conveys these reaction containers 2011 along a predetermined path. As one concrete configuration, the reaction disk 201 is turned and stopped in an alternating manner by the drive mechanism 4, and this alternating motion may be repeated at regular time intervals, e.g., every 4.5 seconds or 9.0 seconds (hereinafter, each time interval will be called "one cycle"). Each reaction container 2011 may be formed of, for example, a glass material, a polypropylene (PP) material, or an acrylic material.

The constant temperature part 202 stores a thermal medium set at a predetermined temperature. By immersing the reaction containers 2011 in the stored thermal medium, the constant temperature part 202 increases the temperature of the mixture liquid contained in the reaction containers 2011.

The rack sampler 203 supports sample racks 2031 in such a manner that the sample racks 2031 can be moved. Each sample rack 2031 is adapted to hold multiple sample containers 2032 containing measurement-requested samples. FIG. 2 shows an example where the sample racks 2031 are each capable of holding a row of five sample containers 2032.

The rack sampler 203 includes a conveyor region where the sample racks 2031 are conveyed from a feed position for slotting in the sample racks 2031 to a recovery position for collecting the sample racks 2031 that have undergone the measurement operation. In the conveyor region, the multiple sample racks 2031 are arranged with their short sides aligned, and moved in a direction D1 by the drive mechanism 4.

The rack sampler 203 also includes a carry-in region where one or more sample racks 2031 are drawn from the conveyor region so that each sample container 2032 held by the sample racks 2031 is moved to a predetermined sample aspirating position. This sample aspiration position is set at, for example, an intersection between the round trajectory of the sample dispensing probe 207 and the traveling path of the openings of the sample containers 2032 that are held by the sample rack 2031 and supported by the rack sampler 203. In the carry-in region, the incoming sample rack 2031 is moved in a direction D2 by the drive mechanism 4.

The rack sampler 203 further includes a carry-back region where one or more sample racks 2031 holding the sample containers 2032 from which the samples have been aspirated are returned to the conveyor region. In the carry-back region, the sample rack 2031 is moved in a direction D3 by the drive mechanism 4.

The first reagent depository 204 is adapted for cold storage of multiple reagent containers 100 containing a first reagent for reaction with a given component in standard samples and subject samples. While not illustrated in FIG. 2, the first reagent depository 204 may be covered by a detachable reagent cover. The first reagent depository 204 encloses reagent racks in such a manner that the reagent racks can turn. The reagent racks hold the multiple reagent containers 100 in an annular arrangement. The reagent racks are turned by the drive mechanism 4.

One or more first reagent aspirating positions are set at predetermined positions on the first reagent depository 204. For example, each first reagent aspirating position is set at an intersection between the round trajectory of the first reagent dispensing probe 209 and the traveling path of the openings of the reagent containers 100 annularly arranged by the reagent racks.

The second reagent depository 205 is adapted for cold storage of reagent containers 100 that contain a second reagent for constituting a dual-reagent system with the first reagent. While not illustrated in FIG. 2, the second reagent depository 205 may be covered by a detachable reagent cover. The second reagent depository 205 encloses reagent racks in such a manner that the reagent racks can turn. These reagent racks also hold the multiple reagent containers 100 in an annular arrangement. Note that the second reagent kept at low temperature in the second reagent depository 205 may be a reagent of the same components and the same concentration as the first reagent kept at low temperature in the first reagent depository 204.

One or more second reagent aspirating positions are set at predetermined positions on the second reagent depository 205. For example, each second reagent aspirating position is set at an intersection between the round trajectory of the second reagent dispensing probe 211 and the traveling path of the openings of the reagent containers 100 annularly arranged by the reagent racks.

Next, the sample dispensing arm 206, the sample dispensing probe 207, the first reagent dispensing arm 208, the first reagent dispensing probe 209, the second reagent dispensing arm 210, the second reagent dispensing probe 211, the electrode unit 212, the photometry unit 213, the washing unit 214, and the stirring unit 215 will be described.

The sample dispensing arm 206 is provided between the reaction disk 201 and the rack sampler 203. The sample dispensing arm 206 is adapted so that it can vertically ascend and descend and also horizontally rotate, with the assistance of the drive mechanism 4. The sample dispensing arm 206 carries the sample dispensing probe 207 at its one end.

The sample dispensing probe 207 pivots along an arc circling trajectory in conjunction with the rotation of the sample dispensing arm 206. This circling trajectory is set so that the openings of the sample containers 2032 held by the sample rack 2031 on the rack sampler 203 will come under it.

Also, the circling trajectory of the sample dispensing probe 207 includes one or more sample discharging positions for the sample dispensing probe 207 to discharge aspirated samples to the reaction containers 2011. Each sample discharging position corresponds to an intersection between the circling trajectory of the sample dispensing probe 207 and the traveling path of the reaction containers 2011 held by the reaction disk 201.

The sample dispensing probe 207 is driven by the drive mechanism 4 so that it ascends or descends at a position directly above the opening of one sample container 2032 held by the sample rack 2031 on the rack sampler 203, or at the sample discharging position.

Under the control of the control circuitry 9, the sample dispensing probe 207 aspirates the sample from the sample container 2032 directly below it. Also under the control of the control circuitry 9, the sample dispensing probe 207 discharges the aspirated sample into the reaction container 2011 directly below it at the sample discharging position. In one example, the sample dispensing probe 207 performs a series of dispensing actions including such aspiration and discharge once in one cycle.

The first reagent dispensing arm 208 is provided, for example, between the reaction disk 201 and the first reagent depository 204. The first reagent dispensing arm 208 is adapted so that it can vertically ascend and descend and also horizontally rotate with the assistance of the drive mechanism 4. The first reagent dispensing arm 208 carries the first reagent dispensing probe 209 at its one end.

The first reagent dispensing probe 209 pivots along an arc circling trajectory in conjunction with the rotation of the first reagent dispensing arm 208. This circling trajectory includes said one or more first reagent aspirating positions. Also, the circling trajectory of the first reagent dispensing probe 209 includes one or more first reagent discharging positions set for the first reagent dispensing probe 209 to discharge the aspirated reagent to the reaction containers 2011. Each first reagent discharging position corresponds to an intersection between the circling trajectory of the first reagent dispensing probe 209 and the traveling path of the reaction containers 2011 held by the reaction disk 201.

The first reagent dispensing probe 209 is driven by the drive mechanism 4 so that it ascends or descends at the first reagent aspirating position or the first reagent discharging position on the circling trajectory. Under the control of the control circuitry 9, the first reagent dispensing probe 209 aspirates the first reagent from the reagent container 100 directly below it at the first reagent aspirating position. Also under the control of the control circuitry 9, the first reagent dispensing probe 209 discharges the aspirated first reagent into the reaction container 2011 directly below it at the first reagent discharging position.

The second reagent dispensing arm 210 is provided, for example, between the reaction disk 201 and the second reagent depository 205. The second reagent dispensing arm 210 is adapted so that it can vertically ascend and descend and also horizontally rotate with the assistance of the drive mechanism 4. The second reagent dispensing arm 210 carries the second reagent dispensing probe 211 at its one end.

The second reagent dispensing probe 211 pivots along an arc circling trajectory in conjunction with the rotation of the second reagent dispensing arm 210. This circling trajectory includes said one or more second reagent aspirating positions. Also, the circling trajectory of the second reagent dispensing probe 211 includes one or more second reagent discharging positions set for the second reagent dispensing probe 211 to discharge the aspirated reagent to the reaction containers 2011. Each second reagent discharging position corresponds to an intersection between the circling trajectory of the second reagent dispensing probe 211 and the traveling path of the reaction containers 2011 held by the reaction disk 201.

The second reagent dispensing probe 211 is driven by the drive mechanism 4 so that it ascends or descends at the second reagent aspirating position or the second reagent discharging position on the circling trajectory. Under the control of the control circuitry 9, the second reagent dispensing probe 211 aspirates the second reagent from the reagent container 100 directly below it at the second reagent aspirating position. Also under the control of the control circuitry 9, the second reagent dispensing probe 211 discharges the aspirated second reagent into the reaction container 2011 directly below it at the second reagent discharging position.

The configurations and components pertaining to the automatic analyzing apparatus 1 and the analysis mechanism 2 have been described. Next, liquid level detecting circuitry conventionally employed for a similar analysis mechanism will be explained with reference to FIG. 11.

Figure 11:
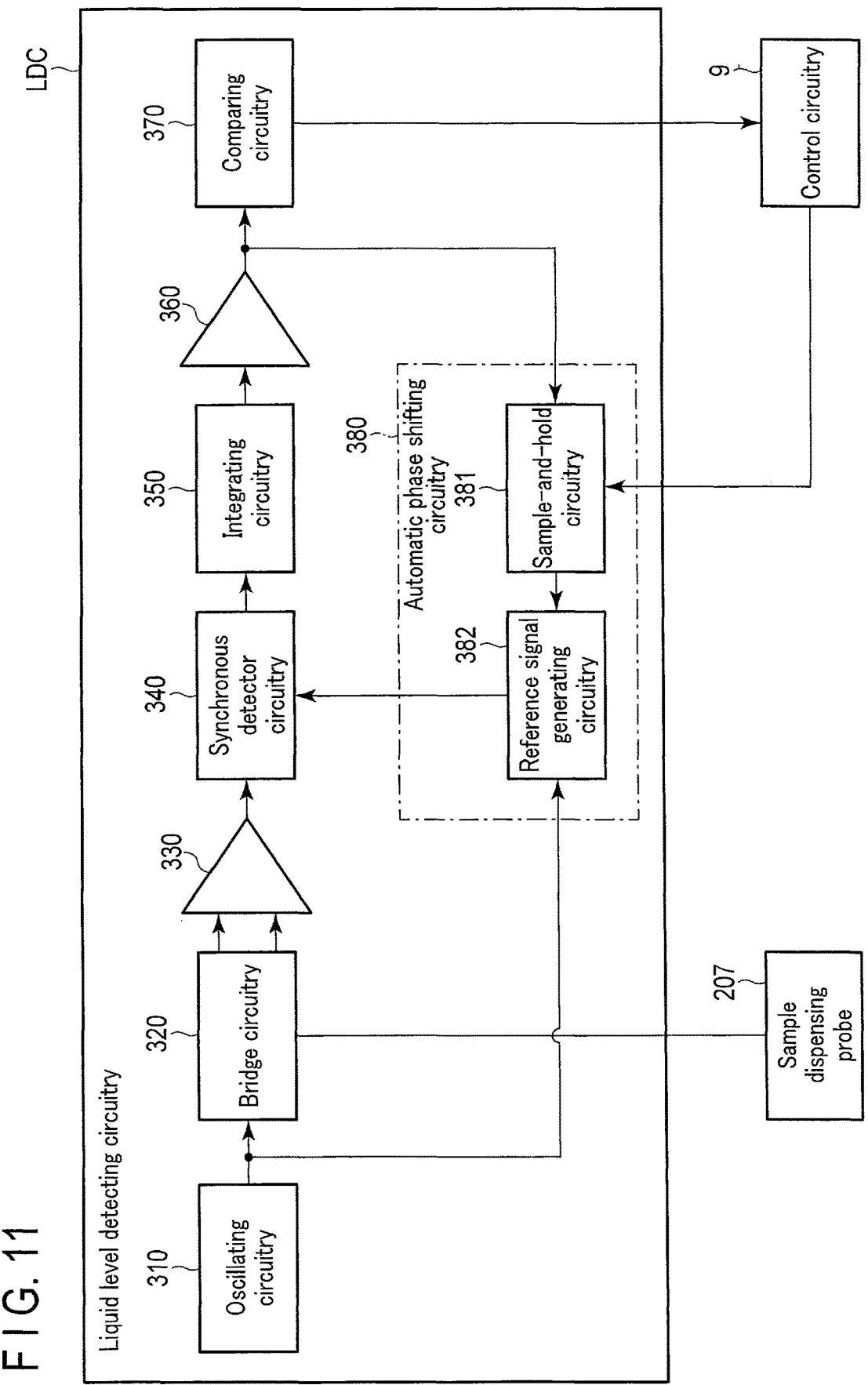
FIG. 11 is a diagram showing an exemplary configuration of liquid level detecting circuitry employed in the conventional art.

FIG. 11 is a diagram showing an exemplary configuration of liquid level detecting circuitry LDC according to the conventional art. As shown in FIG. 11, the liquid level detecting circuitry LDC includes oscillating circuitry 310, bridge circuitry 320, differential amplifier circuitry 330, synchronous detector circuitry 340, integrating circuitry 350, amplifying circuitry 360, comparing circuitry 370, and automatic phase shifting circuitry 380. The automatic phase shifting circuitry 380 includes sample-and-hold circuitry 381 and reference signal generating circuitry 382.

The liquid level detecting circuitry LDC is electrically connected to the sample dispensing probe 207. The liquid level detecting circuitry LDC detects a contact between the sample dispensing probe 207 and a liquid surface, and outputs information based on this detection ("detection information") to the control circuitry 9. The detection information includes, for example, information obtained at the instant of contact with the liquid surface, and information obtained during the contact with the liquid surface. Also, the liquid level detecting circuitry LDC receives from the control circuitry 9 a zero adjustment signal for triggering an adjustment operation of the liquid level detecting circuitry LDC. The liquid level detecting circuitry LDC has a function of automatically adjusting output variations in response to an input of this zero adjustment signal, so as to make its output value zero during the period where the sample dispensing probe 207 and the liquid surface are not in contact with each other. These variations include, for example, output variations due to electrostatic capacitance of a fixed capacitor CO in the bridge circuitry 320, output variations due to changes in intrinsic capacity according to the movement of the sample dispensing probe 207, and so on.

The oscillating circuitry 310 generates an oscillation signal of a predetermined frequency. The oscillating circuitry 310 outputs the oscillation signal to the bridge circuitry 320 and the automatic phase shifting circuitry 380.

The bridge circuitry 320 receives an input of the oscillation signal from the oscillating circuitry 310. The bridge circuitry 320 is electrically connected to the sample dispensing probe 207. The bridge circuitry 320 outputs voltage signals that take on a potential difference between two connection points in the circuitry to the differential amplifier circuitry 330. A concrete configuration of this bridge circuitry 320 will be described with reference to FIG. 12.

FIG. 12 is a diagram showing one exemplary form of connections for the bridge circuitry 320 and the sample dispensing probe 207 according to the conventional art. The bridge circuitry 320 includes four resistors R1 to R4 and the aforementioned fixed capacitor CO. The four resistors R1 to R4 have the same resistance value. The fixed capacitor CO has an electrostatic capacitance that balances the normal state of the sample dispensing probe 207. The normal state here refers to a state where the sample dispensing probe 207 and a liquid surface are not in contact with each other. In other words, the bridge circuitry 320 utilizes the presence of the fixed capacitor CO to cancel out electrostatic capacitance that emerges for the normal state of the sample dispensing probe 207, so that the inputs to the differential amplifier circuitry 330 remain balanced. The fixed capacitor CO has an electrostatic capacitance of, for example, 3.3 pF. Note that, for the sake of convenience in the subsequent description, a point at which multiple components or elements or the like are connected to one another will be called a "connection point". The bridge circuitry 320 includes four connection points P1 to P4.

The connection point P1 is a point at which one end of the oscillating circuitry 310, one end of the resistor R1, and one end of the resistor R4 are connected to one another. The other end of the oscillating circuitry 310 is grounded. The other end of the resistor R1 is connected to the connection point P2. The other end of the resistor R4 is connected to the connection point P4.

The connection point P2 is a point at which the other end of the resistor R1, one end of the resistor R2, and one end of the fixed capacitor CO are connected to one another. The other end of the resistor R2 and the other end of the fixed capacitor CO are connected to the connection point P3. As such, the resistor R2 and the fixed capacitor CO are connected in parallel with each other. The connection point P2 also has a connection to the first input terminal of the differential amplifier circuitry 330.

The connection point P3 is a point at which the other end of the resistor R2, the other end of the fixed capacitor CO, and one end of the resistor R3 are connected to one another. Also, the connection point P3 is grounded.

The connection point P4 is a point at which the other end of the resistor R3, the other end of the resistor R4, and the sample dispensing probe 207 are connected to one another. The connection point P4 also has a connection to the second input terminal of the differential amplifier circuitry 330.

The bridge circuitry 320 with the above configuration allows for the detection of whether or not the sample dispensing probe 207 and a liquid surface are in contact with each other, using the voltages that take on a potential difference between the connection points P2 and P4. The fixed capacitor CO is set so that it has an electrostatic capacitance that makes this potential difference zero when the sample dispensing probe 207 is in the normal state.

The differential amplifier circuitry 330 receives inputs of the voltage signals with the potential difference between the connection points P2 and P4, from the bridge circuitry 320. The differential amplifier circuitry 330 generates a differentially amplified signal by subjecting the input voltage signals to differential amplification, and outputs this differentially amplified signal to the synchronous detector circuitry 340.

The synchronous detector circuitry 340 receives an input of the differentially amplified signal from the differential amplifier circuitry 330 and an input of a reference signal from the automatic phase shifting circuitry 380. The synchronous detector circuitry 340 operates as if it selectively picks out only the differentially amplified signal having a same frequency component as that of the reference signal. More specifically, the synchronous detector circuitry 340 generates a synchronized detection signal by performing full-wave rectification according to the polarities of the differentially amplified signal and the synchronized reference signal, and outputs this synchronized detection signal to the integrating circuitry 350.

When the sample dispensing probe 207 and the liquid surface are not in contact with each other, the synchronized detection signal output from the synchronous detector circuitry 340 indicates zero, as the phase difference between the differentially amplified signal and the reference signal is set to be 90 degrees. Even if the differentially amplified signal is varied to some extent, the synchronized detection signal output from the synchronous detector circuitry 340 indicates zero since the phase of the reference signal is adjusted by the automatic phase shifting circuitry 380.

The integrating circuitry 350 receives an input of the synchronized detection signal from the synchronous detector circuitry 340. The integrating circuitry 350 generates a low-pass signal by blocking a frequency component of the synchronized detection signal that is equal to or higher than a predetermined frequency while permitting the other frequency components to pass through, and outputs this low-pass signal to the amplifying circuitry 360.

The amplifying circuitry 360 receives an input of the low-pass signal from the integrating circuitry 350. The amplifying circuitry 360 generates its output signal by amplifying the low-pass signal, and outputs this output signal to the comparing circuitry 370 and the automatic phase shifting circuitry 380.

The comparing circuitry 370 receives an input of the output signal from the amplifying circuitry 360. The comparing circuitry 370 accordingly generates the aforementioned detection information by comparing the output signal with preset detection levels. For example, the detection information constituted by the information at the instant of contact with the liquid surface is obtained by inputting the output signal to differentiating circuitry (not illustrated in the figure) and then inputting an output from this differentiating circuitry in a comparator (not illustrated in the figure). Also for example, the detection information constituted by the information during contact with the liquid surface is obtained by inputting the output signal to the comparator (not illustrated in the figure). The comparing circuitry 370 outputs the detection information to the control circuitry 9.

The automatic phase shifting circuitry 380 receives an input of the oscillation signal from the oscillating circuitry 310, an input of the output signal from the amplifying circuitry 360, and an input of the zero adjustment signal from the control circuitry 9. In response to the input of the zero adjustment signal as a trigger, the automatic phase shifting circuitry 380 generates the reference signal based on the oscillation signal and the output signal (from the amplifying circuitry 360). The automatic phase shifting circuitry 380 outputs the reference signal to the synchronous detector circuitry 340.

The sample-and-hold circuitry 381 in the automatic phase shifting circuitry 380, in response to the input of the zero adjustment signal, amplifies the received output signal using an error amplifier (not illustrated in the figure) and holds the thus-generated amplified signal. The sample-and-hold circuitry 381 outputs the held amplified signal to the reference signal generating circuitry 382.

Upon receiving an input of the amplified signal from the sample-and-hold circuitry 381, the reference signal generating circuitry 382 generates the reference signal based on the oscillation signal and the amplified signal. The reference signal here has a phase difference of 90 degrees from the oscillation signal. The configuration of the automatic phase shifting circuitry 380 will be described in more detail, with reference to FIG. 13.

Figure 13:
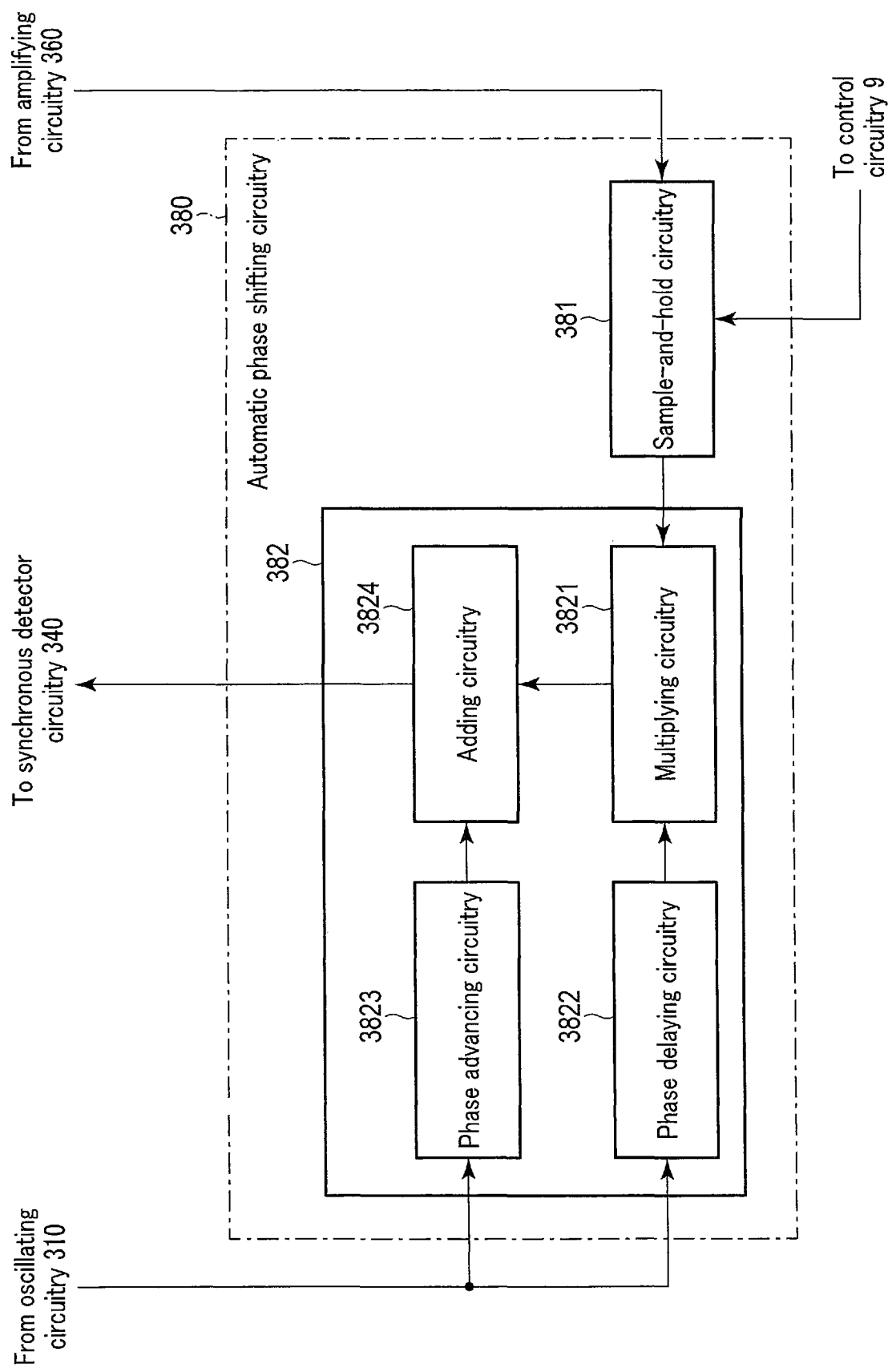
FIG. 13 is a diagram showing an exemplary configuration of the automatic phase shifting circuitry in FIG. 11 as the conventional art.

FIG. 13 is a diagram showing an exemplary configuration of the automatic phase shifting circuitry 380 in FIG. 11 according to the conventional art. As described above, the automatic phase shifting circuitry 380 includes the sample-and-hold circuitry 381 and the reference signal generating circuitry 382. The reference signal generating circuitry 382 includes multiplying circuitry 3821, phase delaying circuitry 3822, phase advancing circuitry 3823, and adding circuitry 3824.

The phase delaying circuitry 3822 generates a phase delayed signal by applying a given phase delay to the oscillation signal. The phase delaying circuitry 3822 outputs the phase delayed signal to the multiplying circuitry 3821.

The multiplying circuitry 3821 generates a multiplication product signal by multiplying the amplified signal by the phase delayed signal. The multiplying circuitry 3821 outputs the multiplication product signal to the adding circuitry 3824.

The phase advancing circuitry 3823 generates a phase advanced signal by applying a given phase lead to the oscillation signal. The phase advancing circuitry 3823 outputs the phase advanced signal to the adding circuitry 3824.

The adding circuitry 3824 receives an input of the multiplication product signal from the multiplying circuitry 3821 and an input of the phase advanced signal from the phase advancing circuitry 3823. The adding circuitry 3824 generates the reference signal by adding together the multiplication product signal and the phase advanced signal. The adding circuitry 3824 outputs the reference signal to the synchronous detector circuitry 340.

As described above, the conventional liquid level detecting circuitry LDC with the automatic phase shifting circuitry 380 can absorb, to some extent, output variations occurring when the sample dispensing probe 207 is not in contact with the liquid surface. As one example, even when the fixed capacitor C0 provided in the bridge circuitry 320 has an electrostatic capacitance that deviates from 3.3 pF, the liquid level detecting circuitry LDC can absorb output variations due to the deviation of from 0 to 8 pF. As another example, the liquid level detecting circuitry LDC can similarly absorb the output variations due to changes in intrinsic capacity according to the movement of the sample dispensing probe 207, to some extent.

In other words, the conventional liquid level detecting circuitry LDC is capable of detecting changes in amplitude and phase of a signal which occur along with a change in impedance due to contact between the probe and the liquid surface and, while the probe and the liquid surface are not in contact with each other, adjusting the voltage value based on the signal to a predetermined value.

However, in the event that output variations are large, the conventional liquid level detecting circuitry LDC can no longer absorb the variations. For example, supposing that the sample-and-hold circuitry 381 gives an output that has a voltage value equal to or higher than a first voltage value (e.g., +15 V), or equal to or lower than a second voltage value (e.g., −15 V), the liquid level detecting circuitry LDC would have difficulty in adjusting the reference signal through the automatic phase shifting, and it would become unable to absorb the resulting large variations. The cause of such large variations is, for example, the sample dispensing probe 207 being electrically connected with an instrument or the like (such as a piercer needle) for use with the sample dispensing probe 207. That is, a large capacitance increase on the probe side makes it impossible to maintain the balance of the differential inputs by the presence of the fixed capacitor C0 alone.

The liquid level detecting circuitry conventionally employed for the analysis mechanism has been explained with reference to FIGS. 11 to 13. Note that the explanation has been given in relation to the sample dispensing probe, but it is applicable also to other types of probes (e.g., a reagent dispensing probe).

Next, the liquid level detecting circuitry 21 according to the first embodiment will be described with reference to FIG. 3. For the sake of description, it will be assumed that the liquid level detecting circuitry 21 according to the first embodiment detects contact between the sample dispensing probe 207 and a liquid surface. It will also be assumed that in the first embodiment, the sample dispensing probe 207 is used with an instrument, e.g., a piercer needle.

Figure 3:
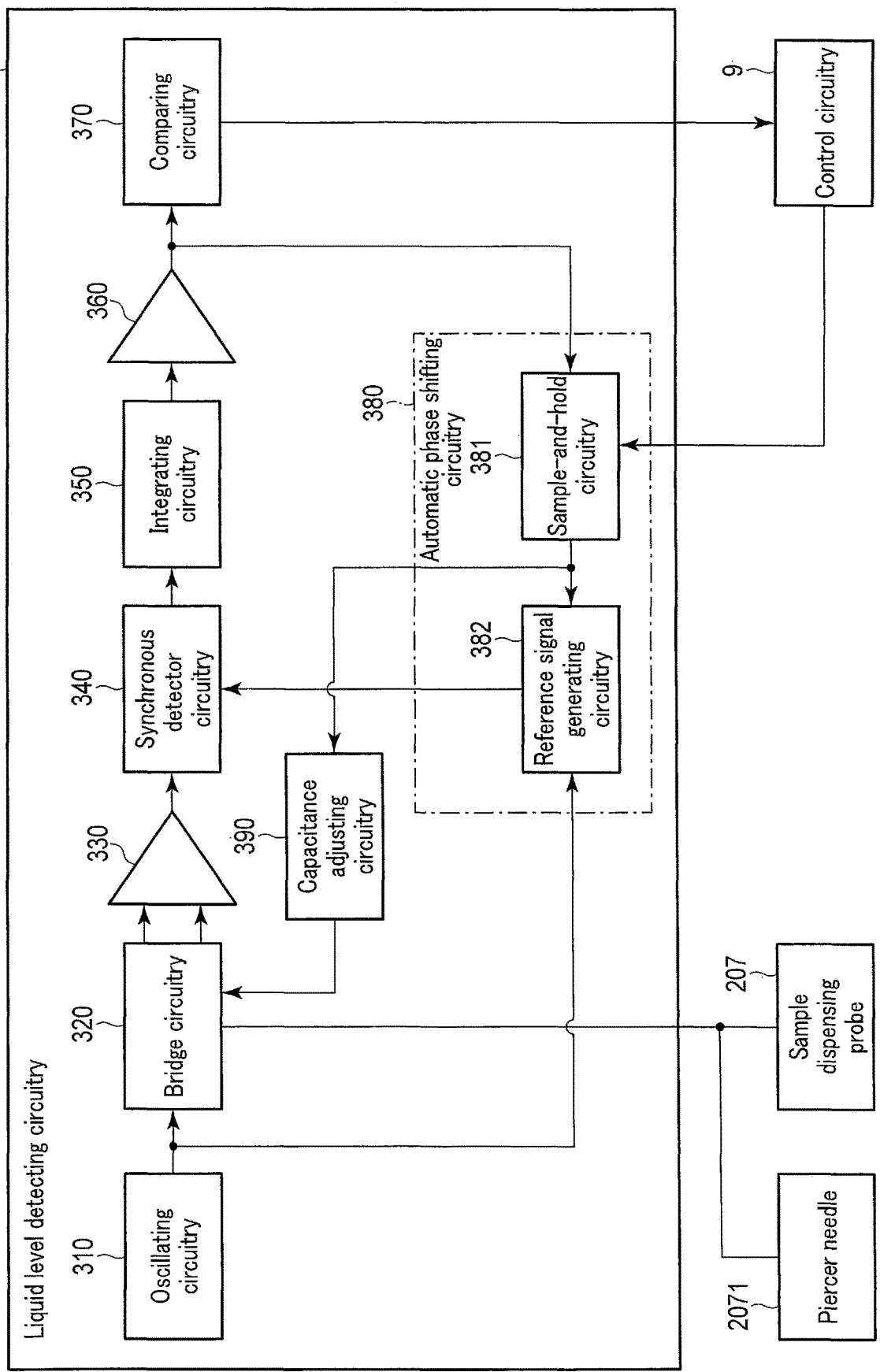
FIG. 3 is a diagram showing an exemplary configuration of liquid level detecting circuitry employed in the first embodiment.

FIG. 3 is a diagram showing an exemplary configuration of the liquid level detecting circuitry 21 according to the first embodiment. As shown in FIG. 3, the liquid level detecting circuitry 21 includes its own oscillating circuitry 310, bridge circuitry 320, differential amplifier circuitry 330, synchronous detector circuitry 340, integrating circuitry 350, amplifying circuitry 360, comparing circuitry 370, and automatic phase shifting circuitry 380, and further capacitance adjusting circuitry (adjuster) 390. The automatic phase shifting circuitry 380 here includes sample-and-hold circuitry 381 and reference signal generating circuitry 382.

The liquid level detecting circuitry 21 differs from the liquid level detecting circuitry LDC shown in FIG. 11 in that it additionally includes the capacitance adjusting circuitry 390. The liquid level detecting circuitry 21 is electrically connected to the sample dispensing probe 207. The liquid level detecting circuitry 21 is also electrically connected to a piercer needle 2071. This piercer needle 2071 will be described with reference to FIGS. 4 and 5.

Figure 4:
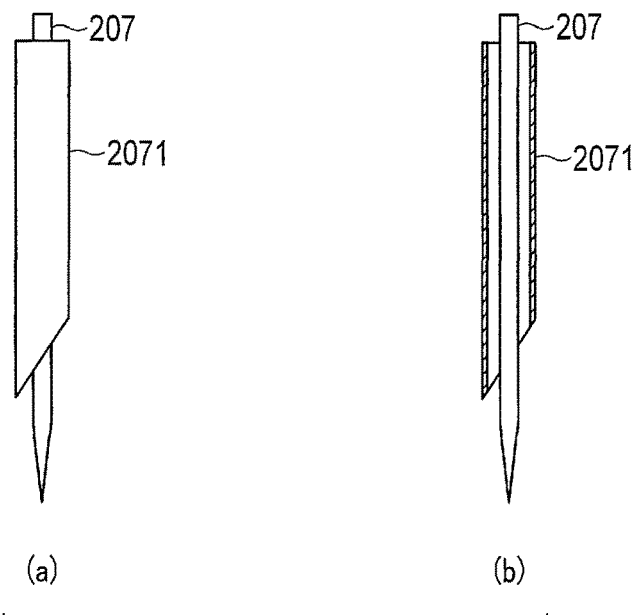
FIG. 4 is a diagram showing one example of a sample dispensing probe with a piercer needle employed in the first embodiment.

FIG. 4 is a diagram showing one example of the sample dispensing probe 207 with the piercer needle 2071 employed in the first embodiment. FIG. 4 (a) shows the sample dispensing probe 207 fit into the piercer needle 2071, and FIG. 4 (b) shows their cross-section in this state. The piercer needle 2071 is constituted by a vertically extending cylindrical tube through which the sample dispensing probe can be inserted. The piercer needle 2071 is opened at its top and sharpened at its bottom. The piercer needle 2071 is used for making a hole in a lid 20321 of each sample container 2032.

Figure 5:
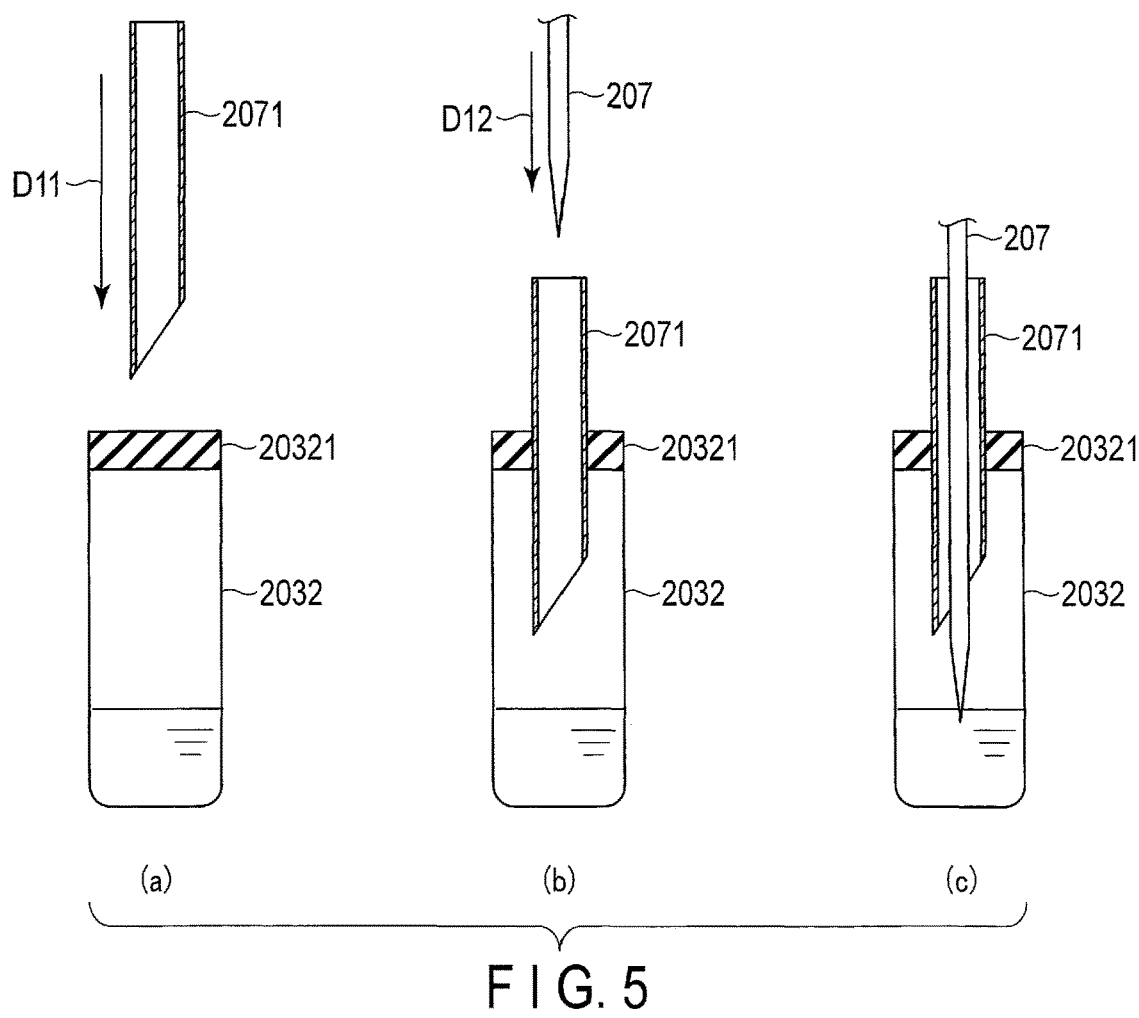
FIG. 5 is a diagram showing one example of how the sample dispensing probe and the piercer needle in FIG. 4 are moved.

FIG. 5 is a diagram showing one example of how the sample dispensing probe 207 and the piercer needle 2071 shown in FIG. 4 are moved. As shown in FIG. 5 (a), the piercer needle 2071 is moved in a direction D11 from directly above the sample container 2032 by the drive mechanism 4. The piercer needle 2071 moved in the direction D11 accordingly punctures the lid 20321 which seals the sample container 2032. Then, as shown in FIG. 5 (b), the sample dispensing probe 207 is moved in a direction D12 so that it enters the piercer needle 2071. Then, as shown in FIG. 5 (c), the sample dispensing probe 207 with the piercer needle 2071 aspirates the sample contained in the sample container 2032.

The automatic phase shifting circuitry 380 of the liquid level detecting circuitry 21 further outputs the amplified signal, which is also used for generating the reference signal, to the capacitance adjusting circuitry 390. In one concrete configuration, the sample-and-hold circuitry 381 of the automatic phase shifting circuitry 380 outputs the amplified signal to the capacitance adjusting circuitry 390 in response to an input of the zero adjustment signal from the control circuitry 9 as a trigger.

The capacitance adjusting circuitry 390 is electrically connected to the bridge circuitry 320. The capacitance adjusting circuitry 390 receives an input of the amplified signal from the automatic phase shifting circuitry 380. The capacitance adjusting circuitry 390 changes the capacitance connected to the bridge circuitry 320 according to a voltage value of the amplified signal. In other words, the capacitance adjusting circuitry 390 adjusts the electrostatic capacitance of one or more capacitors for the circuitry that is for use in liquid level detection. A concrete configuration of the capacitance adjusting circuitry 390 will be described with reference to FIG. 6.

Figure 6:
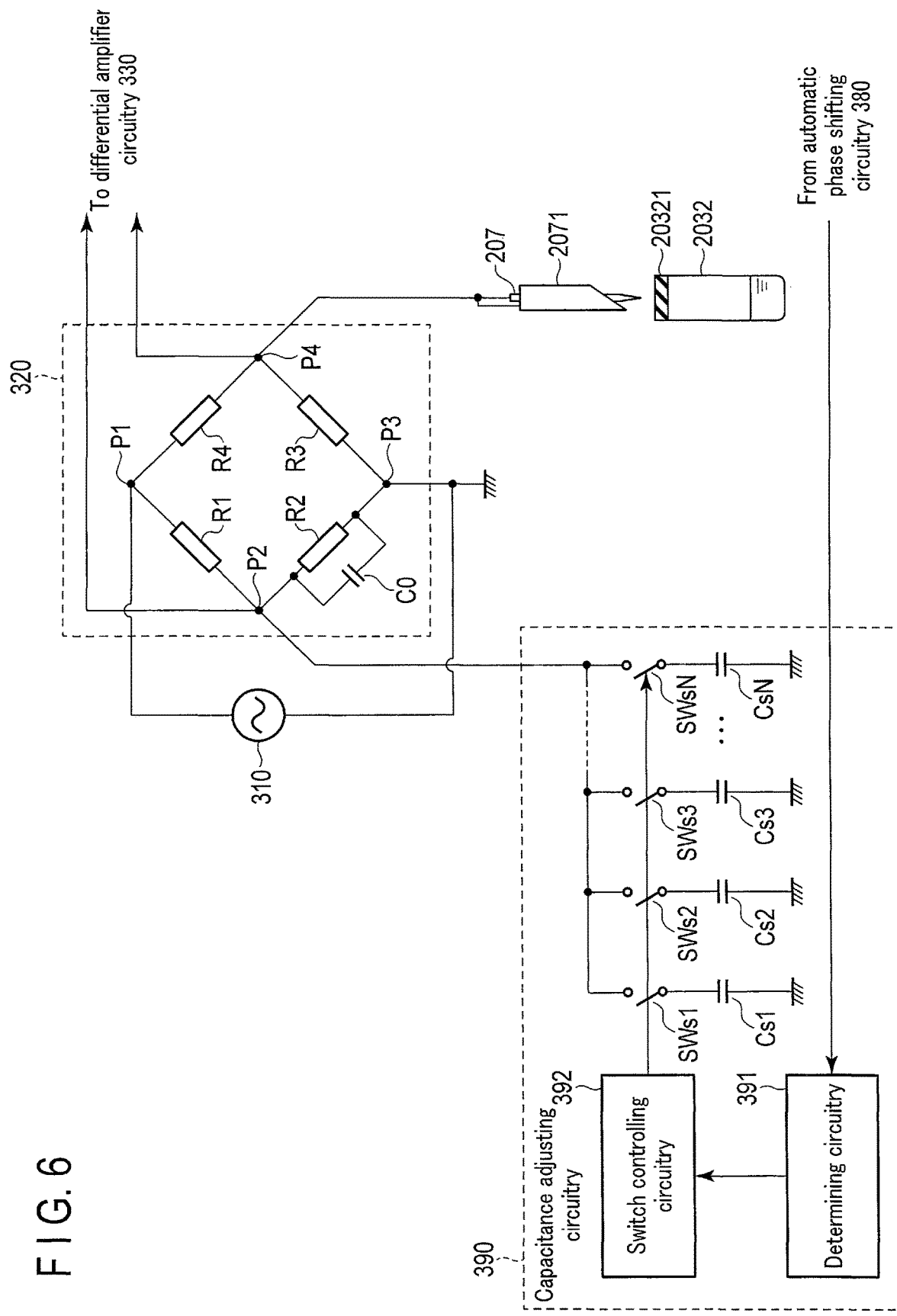
FIG. 6 is a diagram showing one exemplary form of connections for bridge circuitry, capacitance adjusting circuitry, the piercer needle, and the sample dispensing probe in the first embodiment.

FIG. 6 is a diagram showing one exemplary form of connections for the bridge circuitry 320, the capacitance adjusting circuitry 390, the piercer needle 2071, and the sample dispensing probe 207 in the first embodiment. The description will concentrate on the differences from FIG. 12.

The capacitance adjusting circuitry 390 includes determining circuitry 391, switch controlling circuitry 392, multiple switches SWs1 to SWsN, and multiple capacitors Cs1 to CsN. Here, the number N is a design value and may take any value.

The determining circuitry 391 compares the value of the amplified signal with a threshold. More concretely, supposing that the threshold is zero, the determining circuitry 391 determines whether or not the amplified signal has a value of zero. If it is determined that the value of the amplified signal is not zero, the determining circuitry 391 generates a determination signal corresponding to the value of the amplified signal. The determining circuitry 391 then outputs the generated determination signal to the switch controlling circuitry 392.

The switch controlling circuitry 392 receives an input of the determination signal from the determining circuitry 391. The switch controlling circuitry 392 generates control signals based on the determination signal for the control of the respective switches SWs1 to SWsN. The switch controlling circuitry 392 outputs the control signals to the respective switches SWs1 to SWsN.

The switches SWs1 to SWsN are all connected to the connection point P2 at their one ends, and they are connected to one ends of the capacitors Cs1 to CsN at their other ends, respectively. The switches SWs1 to SWsN each receive an input of the corresponding control signal from the switch controlling circuitry 392. The switches SWs1 to SWsN then independently switch between an ON state and an OFF state according to the control signals.

The capacitors Cs1 to CsN, at their one ends, are connected to the other ends of the switches SWs1 to SWsN, respectively, and the other ends of the capacitors Cs1 to. CsN are all grounded. The capacitors Cs1 to CsN may each have a unique capacitance that differ from the others, or at least two of the capacitors Cs1 to CsN may have the same capacitance.

In the bridge circuitry 320, the connection point P2 has a further connection to each of the one ends of the switches SWs1 to SWsN. Also in the bridge circuitry 320, the connection point P4 has a further connection to the piercer needle 2071. With the connection point P4 connected to the piercer needle 2071, an increase in electrostatic capacitance occurs for the piercer needle 2071, and therefore, the capacitance adjusting circuitry 390 virtually adjusts the capacitance of the fixed capacitor C0 by controlling the multiple switches SWs1 to SWsN to make a balance with the electrostatic capacitance of the set of the sample dispensing probe 207 and the piercer needle 2071. As one example, if the connection with the piercer needle 2071 makes the capacitance of the connection point P4 side approximately 10 pF, a balance between the two outputs from the bridge circuitry 320 cannot be maintained only by the capacitance (e.g., 3.3 pF) of the fixed capacitor C0 on the connection point P2 side. Therefore, the first embodiment employs the capacitance adjusting circuitry 390 to increase the capacitance on the connection point P2 side so that the two outputs from the bridge circuitry 320 are balanced.

As described above, an automatic analyzing apparatus according to the first embodiment adjusts the electrostatic capacitance of one or more capacitors provided for circuitry electrically connected to a sample dispensing probe and used for liquid level detection through detection of contact between the sample dispensing probe and the liquid surface. Thus, the first embodiment enables the automatic analyzing apparatus to improve accuracy of the liquid level detection, and to accordingly realize the capability of conducting tests with enhanced reliability as compared to the conventional art. Moreover, the automatic analyzing apparatus is enabled to absorb variations due to factors such as aging of the piercer needle, etc.

Note that while it has been assumed that the automatic analyzing apparatus according to the first embodiment uses the sample dispensing probe to detect contact with a liquid surface, this does not pose any limitations. In other examples, the liquid level may be detected using the piercer needle. Such a configuration contributes to the reduction in diameter of the sample dispensing probe.

Second Embodiment

The first embodiment has been described assuming an exemplary configuration in which the capacitance adjusting circuitry is connected so that the electrostatic capacitance of the fixed capacitor C0 provided in the bridge circuitry is increased. Now, the second embodiment will be described assuming an exemplary configuration in which the capacitance adjusting circuitry is connected so that the electrostatic capacitance can be increased on the part of a probe connected to the bridge circuitry.

Figure 7:
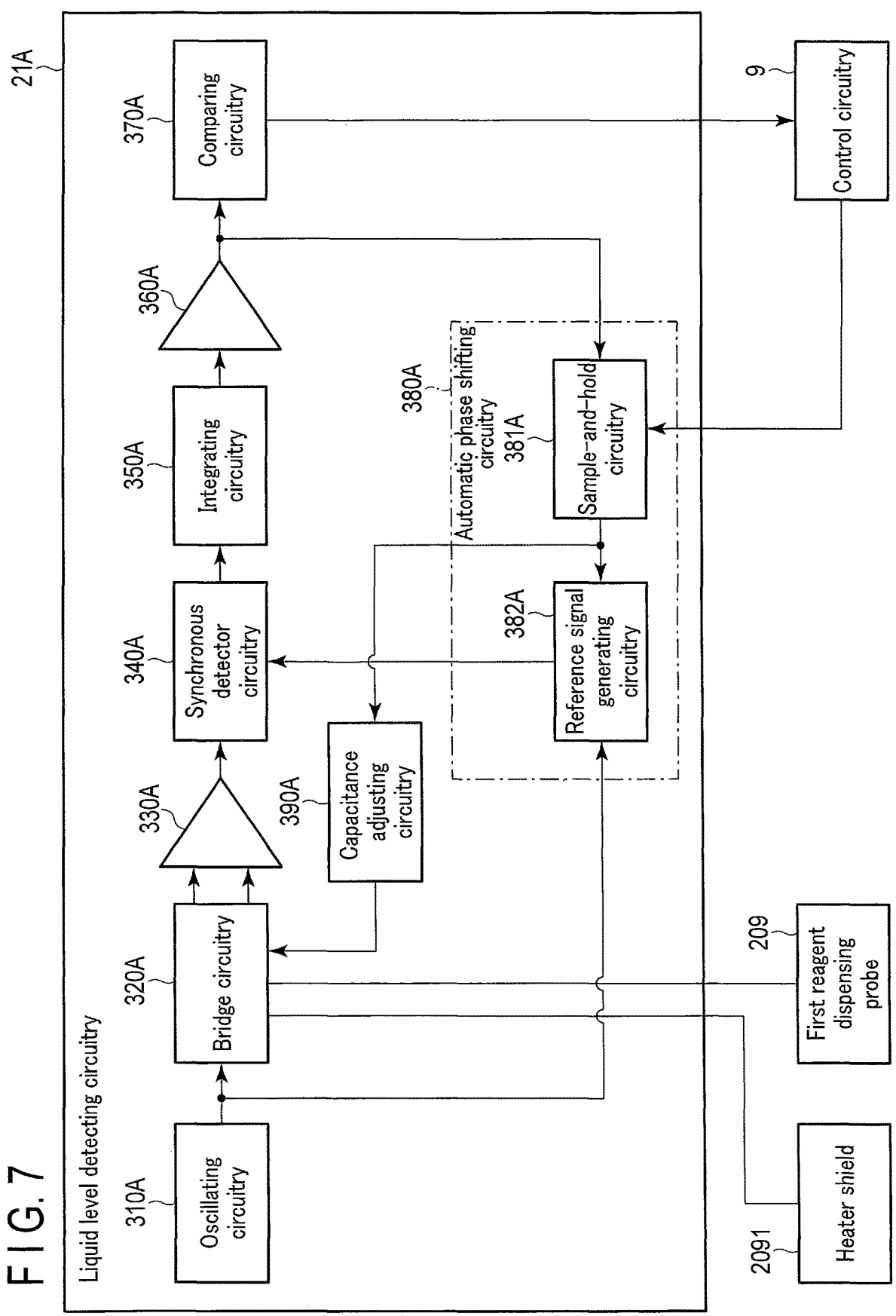
FIG. 7 is a diagram showing an exemplary configuration of liquid level detecting circuitry employed in a second embodiment.

With reference to FIG. 7, liquid level detecting circuitry 21A according to the second embodiment will be described. For the sake of description, it will be assumed that the liquid level detecting circuitry 21A according to the second embodiment detects contact between a reagent dispensing probe and a liquid surface. It will also be assumed that in the second embodiment, the reagent dispensing probe is used with an instrument, e.g., a heater.

FIG. 7 is a diagram showing an exemplary configuration of the liquid level detecting circuitry 21A according to the second embodiment. As shown in FIG. 7, the liquid level detecting circuitry 21A includes oscillating circuitry 310A, bridge circuitry 320A, differential amplifier circuitry 330A, synchronous detector circuitry 340A, integrating circuitry 350A, amplifying circuitry 360A, comparing circuitry 370A, automatic phase shifting circuitry 380A, and capacitance adjusting circuitry 390A. The automatic phase shifting circuitry 380A includes sample-and-hold circuitry 381A and reference signal generating circuitry 382A.

Note that the oscillating circuitry 310A, the differential amplifier circuitry 330A, the synchronous detector circuitry 340A, the integrating circuitry 350A, the amplifying circuitry 360A, the comparing circuitry 370A, and the automatic phase shifting circuitry 380A are substantially the same as the oscillating circuitry 310, the differential amplifier circuitry 330, the synchronous detector circuitry 340, the integrating circuitry 350, the amplifying circuitry 360, the comparing circuitry 370, and the automatic phase shifting circuitry 380, respectively. Thus, their description will be basically omitted.

The liquid level detecting circuitry 21A differs from the liquid level detecting circuitry 21 shown in FIG. 3 in that it detects contact between the first reagent dispensing probe 209 and a liquid surface. The liquid level detecting circuitry 21A is electrically connected to the first reagent dispensing probe 209. The liquid level detecting circuitry 21A is also electrically connected to a heater component, i.e., a heater shield 2091.

Figure 8:
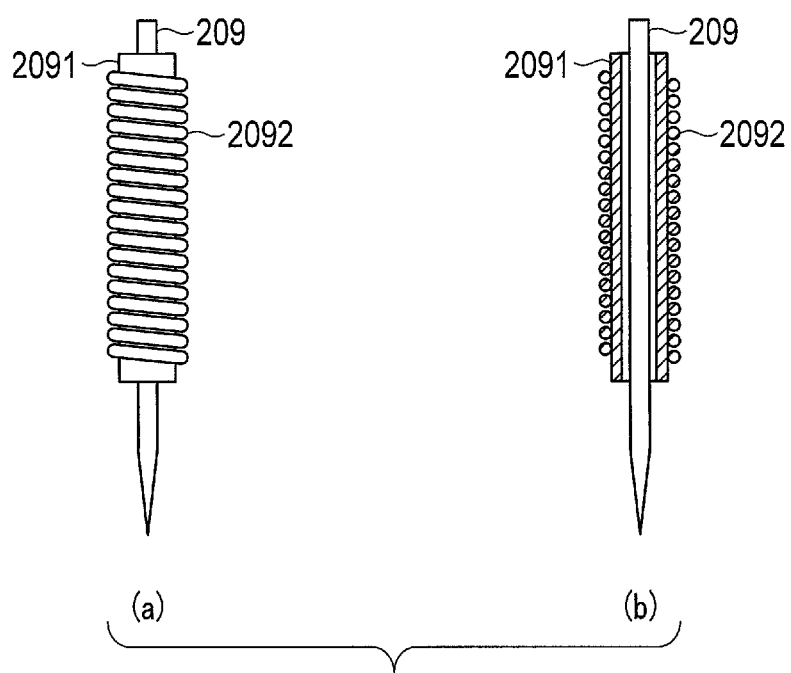
FIG. 8 is a diagram showing one example of a first reagent dispensing probe with a heater employed in the second embodiment.

FIG. 8 is a diagram showing one example of the first reagent dispensing probe 209 with a heater 2092 employed in the second embodiment. FIG. 8 (a) shows the first reagent dispensing probe 209 fit into the heater shield 2091 around which the heater 2092 is wound, and FIG. 8 (b) shows their cross-section in the same state. The heater shield 2091 is an electrically conductive component constituted by a vertically extending cylindrical tube. The first reagent dispensing probe can be inserted through the heater shield 2091. The heater 2092 and the heater shield 2091 are used for warming the first reagent retained in the first reagent dispensing probe 209.

Figure 9:
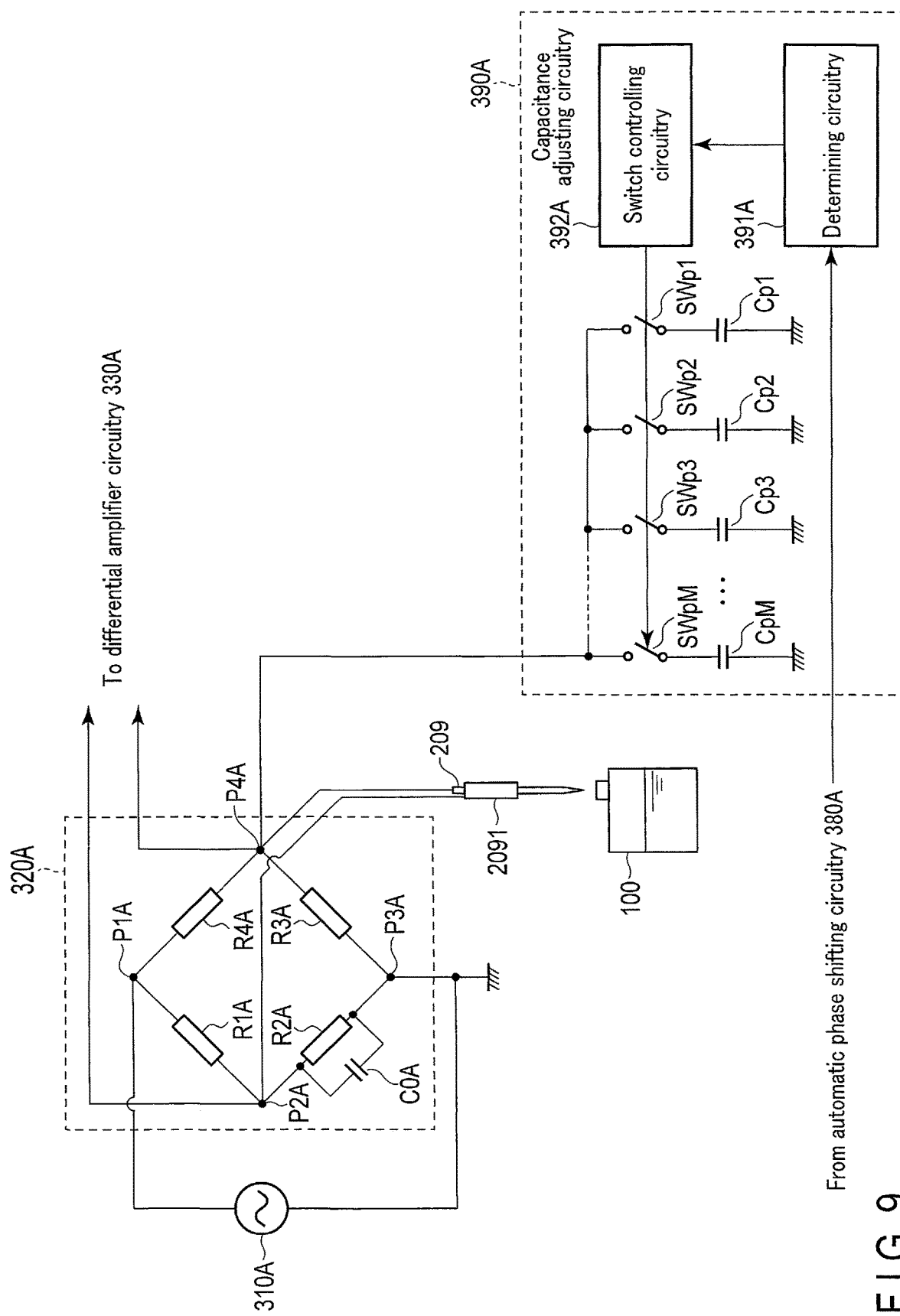
FIG. 9 is a diagram showing one exemplary form of connections for bridge circuitry, capacitance adjusting circuitry, a heater shield, and the first reagent dispensing probe in the second embodiment.

FIG. 9 is a diagram showing one exemplary form of connections for the bridge circuitry 320A, the capacitance adjusting circuitry 390A, the heater shield 2091, and the first reagent dispensing probe 209 in the second embodiment. A description will be given of the differences from FIG. 6 and FIG. 12.

The bridge circuitry 320A receives an input of the oscillation signal from the oscillating circuitry 310A. The bridge circuitry 320A is electrically connected to the first reagent dispensing probe 209 and the heater shield 2091. The bridge circuitry 320A outputs voltage signals that take on a potential difference between two connection points in the circuitry to the differential amplifier circuitry 330A. Note that the first reagent dispensing probe 209 and the heater shield 2091 here are electrically isolated from each other.

As a concrete configuration, the bridge circuitry 320A includes four resistors R1A to R4A and a fixed capacitor C0A. The four resistors R1A to R4A have the same resistance value. The fixed capacitor C0A has an electrostatic capacitance that balances the normal state of the first reagent dispensing probe 209. The normal state here refers to a state where the first reagent dispensing probe 209 and a liquid surface are not in contact with each other. The bridge circuitry 320A also includes four connection points P1A to P4A.

The connection point P1A is a point at which one end of the oscillating circuitry 310A, one end of the resistor R1A, and one end of the resistor R4A are connected to one another. The other end of the oscillating circuitry 310A is grounded. The other end of the resistor R1A is connected to the connection point P2A. The other end of the resistor R4A is connected to the connection point P4A.

The connection point P2A is a point at which the other end of the resistor R1A, one end of the resistor R2A, and one end of the fixed capacitor C0A are connected to one another. The other end of the resistor R2A and the other end of the fixed capacitor C0A are connected to the connection point P3A. As such, the resistor R2A and the fixed capacitor C0A are connected in parallel with each other. The connection point P2A also has a connection to the first input terminal of the differential amplifier circuitry 330A.

The connection point P3A is a point at which the other end of the resistor R2A, the other end of the fixed capacitor C0A, and one end of the resistor R3A are connected to one another. Also, the connection point P3A is grounded.

The connection point P4A is a point at which the other end of the resistor R3A and the other end of the resistor R4A are connected to one another. The connection point P4A also has a connection to the second input terminal of the differential amplifier circuitry 330A.

The bridge circuitry 320A with the above configuration allows for the detection of whether or not the first reagent dispensing probe 209 and a liquid surface are in contact with each other, using the voltages that take on a potential difference between the connection points P2A and P4A. The fixed capacitor C0A is set so that it has an electrostatic capacitance that makes this potential difference zero when the first reagent dispensing probe 209 alone is taken into consideration.

The capacitance adjusting circuitry 390A includes determining circuitry 391A, switch controlling circuitry 392A, multiple switches SWp1 to SWpM, and multiple capacitors Cp1 to CpM. The number M is a design value and may take any value.

The determining circuitry 391A compares the value of the amplified signal with a threshold. More concretely, supposing that the threshold is zero, the determining circuitry 391A determines whether or not the amplified signal has a value of zero. If it is determined that the value of the amplified signal is not zero, the determining circuitry 391A generates a determination signal corresponding to the value of the amplified signal. The determining circuitry 391A then outputs the generated determination signal to the switch controlling circuitry 392A.

The switch controlling circuitry 392A receives an input of the determination signal from the determining circuitry 391A. The switch controlling circuitry 392A generates control signals based on the determination signal for the control of the respective switches SWp1 to SWpM. The switch controlling circuitry 392A outputs the control signals to the respective switches SWp1 to SWpM.

The switches SWp1 to SWpM are all connected to the connection point P4A at their one ends, and they are connected to one ends of the capacitors Cp1 to CpM at their other ends, respectively. The switches SWp1 to SWpM each receive an input of the corresponding control signal from the switch controlling circuitry 392A. The switches SWp1 to SWpM then independently switch between an ON state and an OFF state according to the control signals.

The capacitors Cp1 to CpM, at their one ends, are connected to the other ends of the switches SWp1 to SWpM, respectively, and the other ends of the capacitors Cp1 to CpM are all grounded. The capacitors Cp1 to CpM may each have a unique capacitance that differ from the others, or at least two of the Cp1 to CpM may have the same capacitance.

In the bridge circuitry 320A, the connection point P2A has a further connection to the heater shield 2091. Also in the bridge circuitry 320A, the connection point P4A has a further connection to each of the one ends of the switches SWp1 to SWpM. With the connection point P2A connected to the heater shield 2091, an increase in electrostatic capacitance occurs for the heater shield 2091, and therefore, the capacitance adjusting circuitry 390A virtually adjusts the electrostatic capacitance on the part of the first reagent dispensing probe 209 by controlling the multiple switches SWp1 to SWpM to make a balance with the electrostatic capacitance of the heater shield 2091.

As one example, if the connection with the heater shield 2091 makes the capacitance of the connection point P2A side approximately 190 pF, a balance between the two outputs from the bridge circuitry 320A cannot be maintained only by the capacitance (e.g., approximately 3.3 pF) on the part of the first reagent dispensing probe 209. Therefore, the second embodiment employs the capacitance adjusting circuitry 390A to increase the capacitance on the connection point P4A side so that the two outputs from the bridge circuitry 320A are balanced.

As described above, an automatic analyzing apparatus according to the second embodiment adjusts the electrostatic capacitance of one or more capacitors provided for circuitry electrically connected to a first reagent dispensing probe and used for liquid level detection through detection of contact between the first reagent dispensing probe and the liquid surface. Thus, the second embodiment enables the automatic analyzing apparatus to improve accuracy of the liquid level detection, and to accordingly realize the capability of conducting tests with enhanced reliability as compared to the conventional art. Moreover, the automatic analyzing apparatus according to the second embodiment is provided with capacitance adjusting circuitry that can be designed in conformity with the specification of a heater, and therefore, the second embodiment allows for the use of a heater having a high heating performance, which have conventionally been difficult to employ. Furthermore, the automatic analyzing apparatus is enabled to absorb variations due to factors such as aging of the heater, etc.

Note that while it has been assumed that the first reagent dispensing probe 209 and the heater shield 2091 are electrically isolated from each other, the second embodiment is not limited to such a form. The first reagent dispensing probe 209 and the heater shield 2091 may instead permit electrical conduction to each other, and in that case, a configuration may be adopted where the heater shield 2091 is connected to the connection point P4A and the capacitance adjusting circuitry 390A is connected to the connection point P2A.

Also, while it has been assumed that an instrument, namely, a heater, is used for the first reagent dispensing probe 209, this does not pose any limitations. In other examples, a heater may be employed for the second reagent dispensing probe 211.

Third Embodiment

The first embodiment and the second embodiment have been described assuming an exemplary configuration in which the capacitance adjusting circuitry is connected to either the side where a fixed capacitor is connected or the side where a probe is connected. The third embodiment will be described assuming an exemplary configuration in which the capacitance adjusting circuitry is connected to both of these sides.

Figure 10:
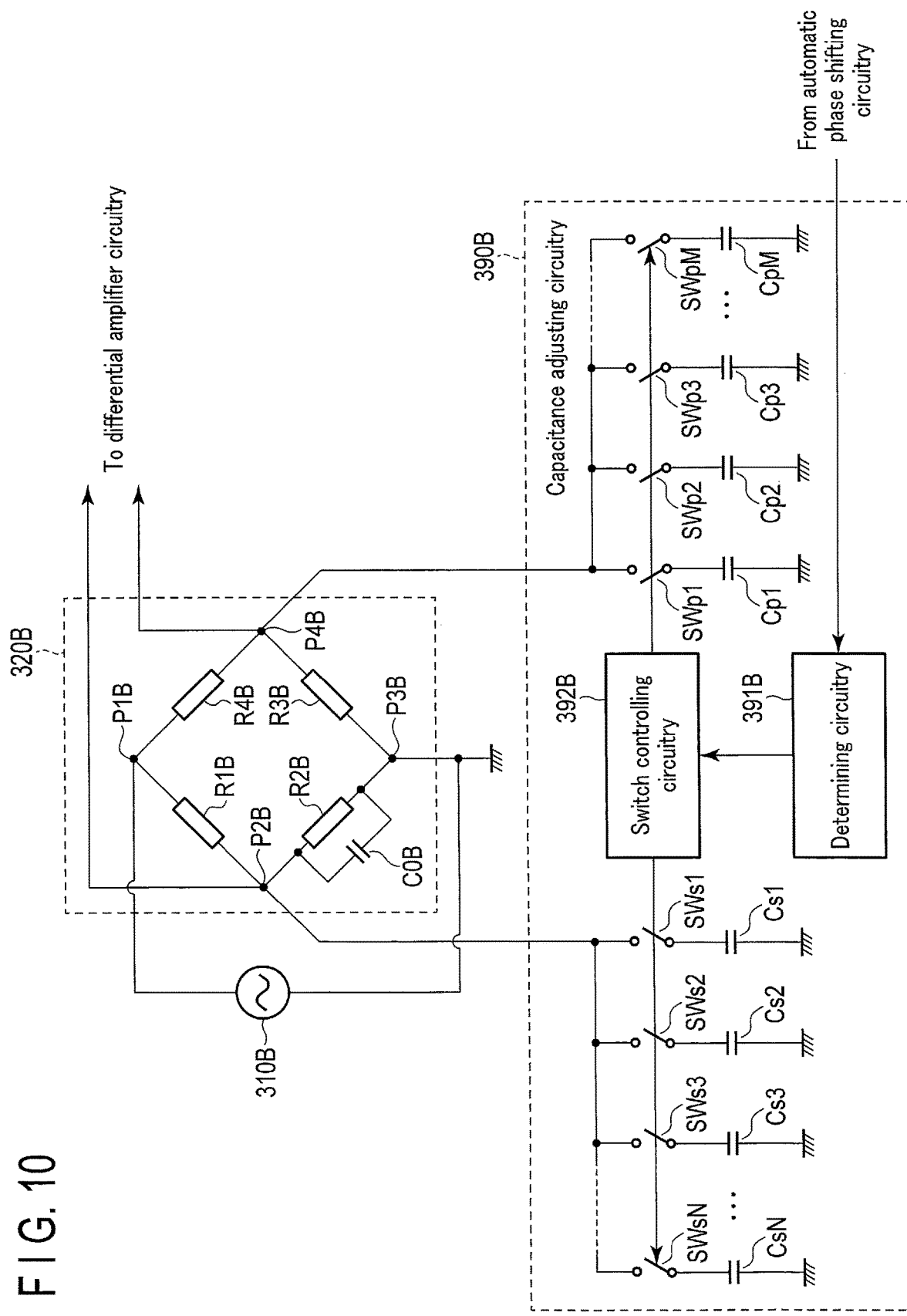
FIG. 10 is a diagram showing one exemplary form of connections for bridge circuitry and capacitance adjusting circuitry in a third embodiment.

FIG. 10 is a diagram showing one exemplary form of connections for bridge circuitry 320B and capacitance adjusting circuitry 390B in the third embodiment. Note that FIG. 10 omits illustration of a probe and instruments (e.g., a piercer needle, a heater, etc.) used with the probe.

The bridge circuitry 320B has substantially the same configuration as that of the bridge circuitry 320 shown in FIG. 6 or that of the bridge circuitry 320A shown in FIG. 9. More specifically, the bridge circuitry 320B includes four resistors R1B to R4B and a fixed capacitor C0B. The four resistors R1B to R4B have the same resistance value. The fixed capacitor C0B has an electrostatic capacitance that balances the normal state of the probe (not illustrated in the figure). The normal state here refers to a state where the probe and a liquid surface are not in contact with each other. The bridge circuitry 320B also includes four connection points P1B to P4B. Note that the four resistors R1B to R4B and the fixed capacitor C0B are connected to one another in substantially the same form as the four resistors R1A to R4A and the fixed capacitor C0A in the foregoing description. Thus, a description of their connection relationships will be omitted.

The capacitance adjusting circuitry 390B includes determining circuitry 391B, switch controlling circuitry 392B, multiple switches SWs1 to SWsN, multiple capacitors Cs1 to CsN, multiple switches SWp1 to SWpM, and multiple capacitors Cp1 to CpM. Each of the numbers N and M is a design value and may take any value.

The determining circuitry 391B compares the value of the amplified signal with a threshold. More concretely, supposing that the threshold is zero, the determining circuitry 391B determines whether or not the amplified signal has a value of zero. If it is determined that the value of the amplified signal is not zero, the determining circuitry 391B generates a determination signal corresponding to the value of the amplified signal. The determining circuitry 391B then outputs the generated determination signal to the switch controlling circuitry 392B.

The switch controlling circuitry 392B receives an input of the determination signal from the determining circuitry 391B. The switch controlling circuitry 392B generates control signals based on the determination signal for the control of at least one of the set of switches SWs1 to SWsN and/or the set of switches SWp1 to SWpM. The switch controlling circuitry 392B outputs the control signals to at least one of the set of switches SWs1 to SWsN and/or the set of switches SWp1 to SWpM.

The switches SWs1 to SWsN are all connected to the connection point P2B at their one ends, and they are connected to one ends of the capacitors Cs1 to CsN at their other ends, respectively. Note that the capacitors Cs1 to CsN are substantially the same as those in the first embodiment, so their description will be omitted.

The switches SWp1 to SWpM are all connected to the connection point P4B at their one ends, and they are connected to one ends of the capacitors Cp1 to CpM at their other ends, respectively. The capacitors Cp1 to CpM are substantially the same as those in the second embodiment, so their description will be omitted.

With the above configuration, an automatic analyzing apparatus according to the third embodiment can balance the two outputs from the bridge circuitry 320B, irrespective of whether an instrument such as a piercer needle or a heater shield is connected to the connection point P2B or the connection point P4B in the bridge circuitry 320B. Also, the control performed by the automatic analyzing apparatus according to the third embodiment utilizes the combination of the multiple switches SWs1 to SWsN and the multiple switches SWp1 to SWpM, and therefore, the third embodiment can realize the control with even higher accuracy than the first and second embodiments.

Other Embodiments

The first to third embodiments have been described assuming that each automatic analyzing apparatus includes a fixed capacitor in the bridge circuitry in order to balance with a probe, but the embodiments are not limited to such a form. For example, the automatic analyzing apparatus according to each embodiment may omit a fixed capacitor, and instead make a balance with the probe using the capacitance adjusting circuitry.

Also, the first to third embodiments have been described assuming that each automatic analyzing apparatus adopts a value of zero as the threshold for the determining circuitry to use in the comparing process, but this does not pose any limitations. For example, the automatic analyzing apparatus according to each embodiment may set a value of the threshold according to an output of the sample-and-hold circuitry which maximizes the outputs of the bridge circuitry, based on the relationship between an output of the sample-and-hold circuitry and outputs of the bridge circuitry at the time of the liquid level detection. One possible value of this threshold would be approximately 0.4 V.

According to at least one embodiment in the foregoing description, the accuracy of the liquid level detection can be improved.

While certain embodiments have been described, they have been presented by way of example only, and are not intended to limit the scope of the inventions. Indeed, the novel embodiments described herein may be embodied in a variety of other forms. Furthermore, various omissions, substitutions, and changes in the form of the embodiments may be made without departing from the spirit of the inventions. The accompanying claims and their equivalents are intended to cover such forms or modifications as would fall within the scope and spirit of the inventions.

The invention claimed is:

1. An automatic analyzing apparatus, comprising:
   a probe; and
   liquid level detection circuitry electrically connected to the probe and configured to detect contact between the probe and a liquid surface,
   wherein the liquid level detection circuitry comprises an adjuster configured to adjust an electrostatic capacitance of one or more capacitors of the liquid level detection circuitry.

2. The automatic analyzing apparatus according to claim 1, wherein the adjuster is further configured to adjust the electrostatic capacitance by ON/OFF-switching one or more of the one or more capacitors in the liquid level detection circuitry.

3. The automatic analyzing apparatus according to claim 1, wherein the liquid level detection circuitry includes bridge circuitry, and the adjuster is further configured to adjust the electrostatic capacitance by ON/OFF-switching one or more of the one or more capacitors connected to the bridge circuitry.

4. The automatic analyzing apparatus according to claim 1, further comprising:
   a piercer needle to make a hole in a lid of a sample container, the piercer needle adapted so that the probe can be inserted through the piercer needle, and
   a drive mechanism configured to drive the piercer needle,
   wherein the adjuster is further configured to adjust variations in electrostatic capacitance due to the piercer needle.

5. The automatic analyzing apparatus according to claim 1, further comprising:
   a heater configured to heat a liquid in the probe, and
   a conductive member between the heater and the probe,
   wherein the adjuster is further configured to adjust variations in the electrostatic capacitance due to the conductive member.

6. The automatic analyzing apparatus according to claim 1, wherein the liquid level detection circuitry is further configured to detect a change in an amplitude and a phase of a signal which occurs along with a change in impedance due to contact between the probe and the liquid surface, and adjust a voltage value based on the signal to a predetermined value while the probe and the liquid surface are not in contact with each other.

7. The automatic analyzing apparatus according to claim 1, wherein the adjuster comprises a plurality of switches, the one or more capacitors, a switch controller, and determining circuitry, the switches are electrically connected to components of the liquid level detection circuitry, and to the one or more capacitors, respectively, and the switch controller is configured to control ON and OFF of the switches according to an input from the determining circuitry.

* * * * *